United States Patent
Nelson

(10) Patent No.: US 10,752,521 B2
(45) Date of Patent: Aug. 25, 2020

(54) SYSTEM AND METHOD FOR TREATMENT OF SOIL AND GROUNDWATER CONTAMINATED WITH PFAS

(71) Applicant: EMINUS, LLC, Castle Rock, CO (US)

(72) Inventor: Christopher Nelson, Castle Rock, CO (US)

(73) Assignee: EMINUS, LLC, Castle Rock, CO (US)

(*) Notice: Subject to any disclaimer, the term of this patent is extended or adjusted under 35 U.S.C. 154(b) by 0 days.

(21) Appl. No.: 16/307,519

(22) PCT Filed: Jun. 9, 2017

(86) PCT No.: PCT/US2017/036740
§ 371 (c)(1),
(2) Date: Dec. 6, 2018

(87) PCT Pub. No.: WO2017/218335
PCT Pub. Date: Dec. 21, 2017

(65) Prior Publication Data
US 2019/0300387 A1 Oct. 3, 2019

Related U.S. Application Data

(60) Provisional application No. 62/349,160, filed on Jun. 13, 2016.

(51) Int. Cl.
*C02F 1/24* (2006.01)
*B09C 1/08* (2006.01)
(Continued)

(52) U.S. Cl.
CPC ............... *C02F 1/24* (2013.01); *B03D 1/082* (2013.01); *B03D 1/1462* (2013.01); *B03D 1/24* (2013.01);
(Continued)

(58) Field of Classification Search
CPC ................. C02F 1/24; C02F 1/78; B09C 1/00
See application file for complete search history.

(56) References Cited

U.S. PATENT DOCUMENTS 4,203,837 A 5/1980 Hoge et al.
4,699,721 A 10/1987 Meenan et al.
(Continued)

FOREIGN PATENT DOCUMENTS

DE 4006435 A1 * 9/1991 ................ C02F 1/66
DE 4006435 A1 9/1991
(Continued)

OTHER PUBLICATIONS

Parker (Positive displacement pump—performance and application, 1994, Proceedings of 11th International Pump Users Symposium). (Year: 1994).*

(Continued)

*Primary Examiner* — Youngsul Jeong
(74) *Attorney, Agent, or Firm* — Marshall & Melhorn, LLC

(57) ABSTRACT

A method for the decontamination of water containing one or more PFAS contaminants includes injecting a gas through a diffuser and into the water so as to form a plurality of bubbles in the water, the one or more PFAS contaminants accumulating on the plurality of bubbles. The plurality of bubbles is allowed to rise, forming a foam at the surface of the water. The resulting foam is then collected and transported away from the surface of the water, where it condenses into a liquid and can be treated and/or disposed of.

19 Claims, 2 Drawing Sheets

(51) Int. Cl.

| | |
|---|---|
| *B09C 1/00* | (2006.01) |
| *C02F 1/78* | (2006.01) |
| *B03D 1/14* | (2006.01) |
| *B03D 1/08* | (2006.01) |
| *B03D 1/24* | (2006.01) |
| *C02F 101/36* | (2006.01) |
| *C02F 103/06* | (2006.01) |
| *C02F 1/02* | (2006.01) |
| *C02F 101/30* | (2006.01) |

(52) U.S. Cl.
CPC ............... *B09C 1/002* (2013.01); *C02F 1/78* (2013.01); *C02F 1/02* (2013.01); *C02F 2101/301* (2013.01); *C02F 2101/36* (2013.01); *C02F 2103/06* (2013.01)

(56) References Cited

U.S. PATENT DOCUMENTS

| | | | |
|---|---|---|---|
| 4,950,394 | A | 8/1990 | Bernhardt et al. |
| 5,063,635 | A | 11/1991 | Ishii et al. |
| 5,261,791 | A | 11/1993 | Goguen |
| 9,694,401 | B2 | 7/2017 | Kerfoot |
| 2003/0039729 | A1 | 2/2003 | Murphy et al. |
| 2008/0023407 | A1 | 1/2008 | Eriksson et al. |
| 2009/0045141 | A1 | 2/2009 | Drewelow |
| 2014/0190896 | A1 | 7/2014 | Dickson |
| 2014/0231326 | A1 | 8/2014 | Biley et al. |
| 2014/0246366 | A1 | 9/2014 | Kerfoot |

FOREIGN PATENT DOCUMENTS

| | | | | |
|---|---|---|---|---|
| EP | 0613725 | A2 | 9/1994 | |
| WO | WO-2014/138062 | A1 * | 9/2014 | ........... A61F 2/4014 |
| WO | 2017098401 | A1 | 6/2017 | |
| WO | 2017131972 | A1 | 8/2017 | |
| WO | 2017210752 | A1 | 12/2017 | |

OTHER PUBLICATIONS

DE-4006435-A1_English Translation (Year: 1991).*
Ebersbach, Ina et al., "An Alternative Treatment Method for Fluorosurfactant-containing Wastewater by Aerosol-mediated Separation," Water Research, May 24, 2016, vol. 101, pp. 333-340.
Lee, Yu-Chi et al., "Recovery of Perfluorooctane Sulfonate (PFOS) and Perfluorooctanoate (PFOA) from Dilute Water Solution by Foam Flotation," Separation and Purification Technology, Sep. 21, 2016, vol. 173, pp. 280-285.
Eberle, Dylan et al., "Impact of ISCO Treatment on PFAA Co-Contaminants at a Former Fire Training Area," Environmental Science & Technology, Apr. 9, 2017, vol. 51, pp. 5127-5136.
"Oil/Water Emulsion and Aqueous Film Forming Foam (AFFF) Treatment Using Air-Sparged Hydrocyclone Technology," ESTCP Environmental Security Technology Certification Program, U.S. Department of Defense, ESTCP Cost and Performance Report (CP-0005), Jan. 2003.
USPTO; International Search Report with Written Opinion dated Aug. 4, 2017, issued in PCT/US2017/036740; 15 pages, U.S. Patent and Trademark Office, Alexandira, Virginia 22313-1450, US.

* cited by examiner

PFOS

PFOA

SYSTEM AND METHOD FOR TREATMENT OF SOIL AND GROUNDWATER CONTAMINATED WITH PFAS

BACKGROUND OF THE INVENTION

This invention relates to a method and device for the decontamination of a media, such as groundwater or groundwater and soil, containing per- and polyfluoroalkyl substances (PFAS) and related compounds such as PFAS precursors, collectively referred to as PFAS contaminants. More specifically, the invention relates to a system and method for concentrating and removing PFAS contaminants from soil and groundwater, preferably using in-situ gas injection and collection of the resulting foam.

PFAS are contained in fire-fighting agents such as aqueous film forming foams (AFFF) and as such have they been used extensively at facilities such as military bases and airports over the past fifty years. They have also been used in the manufacture of many consumer goods for grease repellency and water-proofing. More recently, long-chained PFAS in particular have been shown to bioaccumulate, persist in the environment, and be toxic to laboratory animals, wildlife, and humans. As a result of these observations, on May 19, 2016 EPA established a health advisory for the long-chained PFAS constituents; perfluorooctanoate (PFOA) and perfluorooctane sulfonate (PFOS) of 70 parts per trillion in drinking water.

PFAS have unique chemistry. The carbon-fluorine bond is one of the strongest bonds in nature and it is very difficult break. In addition, PFOA and PFOS, for example, have a perfluorinated carbon tail that preferentially partitions out of the aqueous (water) phase and an ionic headgroup that partitions into the aqueous phase. (See FIG. 1.) This causes PFAS to preferentially accumulate at air/water interfaces.

Because of these characteristics, traditional in-situ remediation technologies such as chemical reduction, chemical oxidation, and bioremediation have not been shown to be effective in treating PFAS. Thermal treatment can be effective, however very high temperatures are needed (greater than 1,770 degrees F.) for complete destruction thereby making in-situ treatment either impracticable or very expensive. Groundwater pump and treat systems can remove PFAS however they are not effective at removing large amounts of contaminant mass and they are also very costly since these systems tend to operate over long periods of time, typically decades. Some success has been reported using immobilization where for example PFAS waste is mixed with clay and aluminum hydroxide. Long term success with the technology under in-situ conditions has not been demonstrated. Therefore, there is an urgent need for a method and system capable of treating PFAS contaminated soil and water in situ.

SUMMARY OF THE INVENTION

The present invention includes a method and system for treating PFAS contaminated media, in particular saturated soil and groundwater. This invention relies on the unique properties of PFAS, namely their tendency to preferentially accumulate at air/water interfaces as shown in FIG. 1. Generally the method involves injecting a gas such as air into a fine bubble diffuser that is placed near the bottom of a groundwater well. Fine (less than 2 mm diameter) bubbles are preferred since they provide the most air to water surface area for the PFAS contaminants to accumulate from the aqueous phase. Since the bubbles are less dense than water, they rise to the water surface where they accumulate as a layer of foam. The foam is removed by applying a vacuum to tube(s) that are located in the foam head and above the groundwater table. Once the foam/air mixture is removed from the well it is piped to a knock-out vessel where the foam condenses to a liquid and the air is discharged.

Given the appropriate site geology and well screen intervals, the method described above has the additional benefit of providing groundwater recirculation since the injected air causes water to migrate up and out of the upper recharge screen (see FIG. 2). Once this happens, water is drawn into the bottom of the well through an influent screen portion and discharged through an effluent screen portion at the top of the well, thereby setting up a water recirculation system. The influent and effluent screen portions can be formed by one or more influent screens that are separate from one or more effluent screens. However, wells with continuous screens can also function in this manner. This increases the radius of influence of the treatment well which means less wells are required to treat a given area. Alternatively or in concurrence, groundwater can be pumped using in-well pumps to increase the radius of influence and efficiency of the treatment wells. This technology can be adapted to a variety of site conditions and implemented in source areas with high PFAS concentrations as well as down-gradient locations with lower PFAS concentrations.

Generally, the system requires a groundwater well screened at appropriate depths based on site-specific geology and PFAS location in the subsurface. An air injection blower or pump is connected into a fine pore diffuser located in the water column. Air is injected into the fine pore diffuser where bubbles are created and PEAS partitions into the air/water interfaces of the bubbles. The bubbles rise and form a foam at the groundwater table. The foam is removed from the well by a vacuum extraction blower or pump. The foam is piped into a sealed knock-out drum or other knock-out vessel, where it condenses into a liquid and the air is discharged. The liquid concentrate can be further treated using thermal incineration, for example, either on- or off-site. The air discharge can be further treated on-site using activated carbon, for example, if necessary.

This invention can be configured as described above with a network of vertical wells and with other configurations including but not limited to a network of horizontal foam generation and collection wells, well networks with separate pumping wells, and groundwater interceptor trenches with vertical or horizontal foam generation and collection wells. Above-ground configurations are also possible using surface mounted tanks instead of groundwater wells.

BRIEF DESCRIPTION OF THE DRAWINGS

The invention is best understood from the following detailed description when read in conjunction with the accompanying figures. It is emphasized that, according to common practice, the various features on the drawings are not to scale. Instead, the dimensions of the various features are arbitrarily expanded or reduced for clarity.

DETAILED DESCRIPTION OF THE INVENTION

Figure 1:
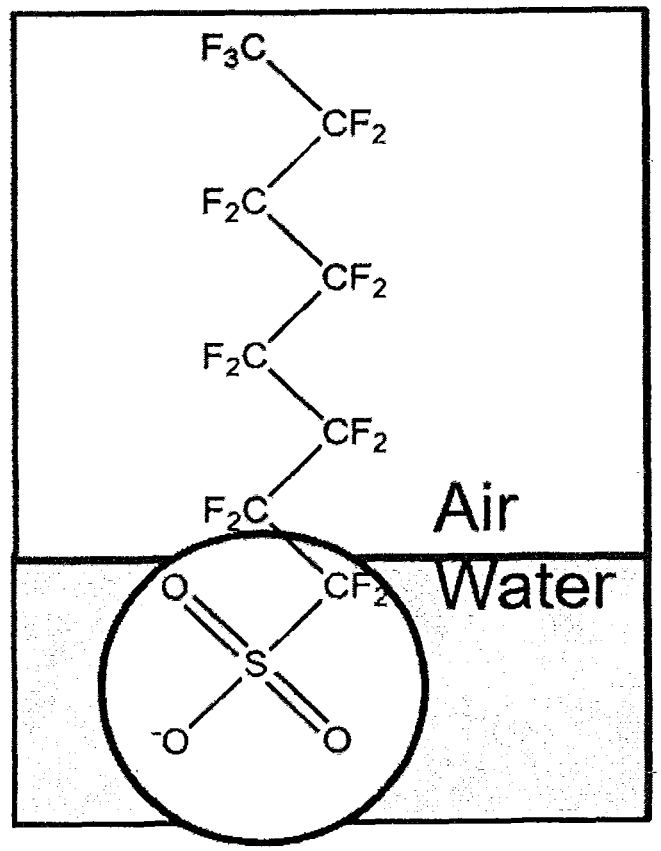
FIG. 1 is a chemical representation of the PFAS contaminates PFOS and PFOA. In addition, this figure shows the preference of PFOS and PFOA to accumulate at air/water interfaces given their unique chemical structure, with a hydrophilic head and hydrophobic tail.
Figure 1:
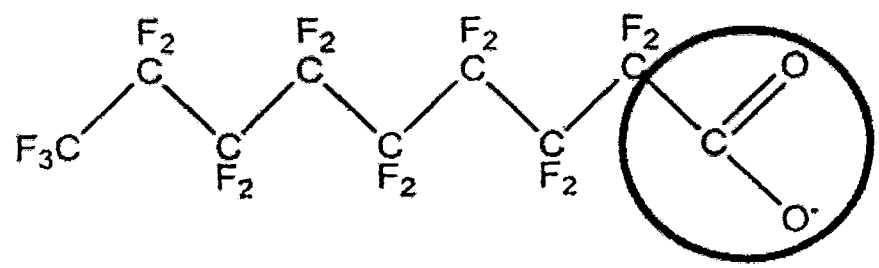

Although the invention is illustrated and described herein with reference to specific embodiments, the invention is not intended to be limited to the details shown. Rather various modifications may be made in the details within the scope and range of equivalents of the claims and without departing from the invention.

Generally, the present invention includes a method and system for removing PFAS from contaminated soil and groundwater. The invention is best understood by referring to FIG. 2. A groundwater well is drilled in an area with PFAS contamination, 1 shows ground surface, 2 indicates the groundwater level, 3 shows the well bore, and 4 shows the well casing, typically PVC. The well is designed to accommodate site-specific conditions including the contaminate location and site hydrogeology. In this particular example, the well is constructed with an upper discharge or effluent screen 14 and a lower influent screen 15. The rest of the well is constructed with blank (solid) PVC. Sandpack is also inserted into the well bore adjacent to the well screens.

A bubble diffuser 6, preferably a fine pore diffuser comprised of a plurality of pores having a nominal pore size of 25 microns or less, is connected to a positive pressure air blower or pump 5. Air is injected into the diffuser 6 which produces bubbles 7. There may be more than one diffuser used especially if the water column in the well is long, generally longer than 10 feet. Alternatively, vertical tube diffusers can be used. Fine pore diffusers can be made of ceramics, polypropylene, porous materials, or other membrane material.

The air/water interface of the bubbles attract PFAS in the aqueous phase as the bubbles migrate vertically. Once the bubbles reach the groundwater surface, they form a layer of foam 8. The foam is removed from the well by a foam capturing device 9 which is connected to a vacuum source 13, such as a vacuum extraction blower or pump. The foam capturing device provides additional surface area for foam capture with a larger diameter than the connecting pipe. In its simplest configuration, the foam capturing device 9 is an expansion chamber connected to the end of the vacuum pipe. In addition, a funnel-shaped device or fine screen may be inserted below, in, or above the foam head to assist with foam accumulation, concentration, and capture. More complicated configurations may include floating foam capturing devices that are made of a floating material connected to a vacuum extraction tube. A device like this would accommodate fluctuating groundwater tables and minimize operation and maintenance. Treatment wells with a deep water table may need to use an in-well pump such as a positive air displacement pump to pump foam and/or concentrate to the surface for collection to overcome vacuum limitations at depth.

The foam is transported by vacuum or positive pressure into a sealed knock-out vessel 10 where it condenses into a liquid 11 and it is periodically removed through a valve 12 for further treatment by, for example, high temperature incineration. Air is discharged from the negative pressure blower or pump 13 where it may be treated using activated carbon, for example.

Producing bubbles in the well, as described above, causes the water column in the well to migrate vertically since it is less dense than the surrounding water. When the well is screened with upper 14 and lower 15 screens, groundwater recirculation is produced as shown by groundwater discharging from the upper screen in the direction of arrow 17 and recharging into the lower screen in the direction of arrow 16. This increases the radius of influence of the well and increases the rate of removal of PFAS from the subsurface. A well with a continuous screen, wherein a lower part of the screen defines an influent screen portion and an upper part of the screen defines an effluent screen portion, can also function in this manner. Depending on the site-specific hydrogeology and length of the water column being treated, in-well water pumps can also be used to recirculate groundwater.

The invention can also be combined with other technologies such as in-situ oxidation to convert PFAS precursors into more extractable substances such as PFOA and PFOS, and soil washing to increase PFAS desorption from soil. Gases other than air may also be used including but not limited to the addition of nitrogen to enhance foam formation and the addition of an oxidizing gas, preferably ozone, to oxidize PFAS precursors. Thus, in an embodiment of the invention, the gas injected into the one or more diffusers is greater than 80% nitrogen by volume, preferably 95% or more nitrogen, and more preferably 99% or more nitrogen. Amendments such as surfactants may also be injected into the treatment area to increase the removal of PFAS, especially short-chain PFAS.

The following examples, which constitute the best mode presently contemplated by the inventor for practicing the present invention, are presented solely for the purpose of further illustrating and disclosing the present invention, and are not to be construed as a limitation on the invention.

Groundwater samples from two sites (designated as N000 and Z000) with PFAS contamination were used for laboratory test to demonstrate the performance of the invention. The analytical data for these sites is shown below.

TABLE 1

Site N000 PFAS Concentrations

| Analyte | Carbon # | Units | Initial |
|---|---|---|---|
| 6:2 Fluorotelomer sulfonate | 6 | ug/L | 0.0069 |
| 8:2 Fluorotelomer sulfonate | 8 | ug/L | BDL |
| Perfluorobutane Sulfonate (PFBS) | 4 | ug/L | 0.27 |
| Perfluorobutanoic acid | 4 | ug/L | 0.14 |
| Perfluorodecane Sulfonate | 6 | ug/L | 0.0072 |
| Perfluorodecanoic Acid (PFDA) | 10 | ug/L | 0.0057 |
| Perfluorododecanoic Acid (PFDoA) | 11 | ug/L | BDL |
| Perfluoroheptanoic Acid (PFHpA) | 7 | ug/L | 0.22 |
| Perfluorohexane Sulfonate (PFHxS) | 6 | ug/L | 5.7 |
| Perfluorohexanoic Acid (PFHxA) | 6 | ug/L | 0.93 |
| Perfluoro-n-Octanoic Acid (PFOA) | 8 | ug/L | 1.7 |
| Perfluorononanoic Acid (PFNA) | 9 | ug/L | 0.055 |
| Perfluorooctane Sulfonamide (PFOSA) | 8 | ug/L | BDL |
| Perfluorooctane Sulfonate (PFOS) | 8 | ug/L | 1.6 |
| Perfluoropentanoic Acid (PFPeA) | 5 | ug/L | 0.31 |
| Perfluorotetradecanoic Acid | 14 | ug/L | BDL |
| Perfluorotridecanoic Acid | 13 | ug/L | BDL |
| Perfluoroundecanoic Acid (PFUnA) | 11 | ug/L | BDL |

Note:
BDL = Below Detection Limit

TABLE 2

Site Z000 PFAS Concentrations

| Analyte | Carbon # | Units | Initial |
|---|---|---|---|
| 6:2 Fluorotelomer sulfonate | 6 | ug/L | 2.8 |
| 8:2 Fluorotelomer sulfonate | 8 | ug/L | BDL |
| Perfluorobutane Sulfonate (PFBS) | 4 | ug/L | 200 |
| Perfluorobutanoic acid | 4 | ug/L | 44 |
| Perfluorodecane Sulfonate | 6 | ug/L | BDL |
| Perfluorodecanoic Acid (PFDA) | 10 | ug/L | BDL |
| Perfluorododecanoic Acid (PFDoA) | 11 | ug/L | BDL |
| Perfluoroheptanoic Acid (PFHpA) | 7 | ug/L | 36 |
| Perfluorohexane Sulfonate (PFHxS) | 6 | ug/L | 1300 |
| Perfluorohexanoic Acid (PFHxA) | 6 | ug/L | 270 |
| Perfluoro-n-Octanoic Acid (PFOA) | 8 | ug/L | 66 |
| Perfluorononanoic Acid (PFNA) | 9 | ug/L | BDL |
| Perfluorooctane Sulfonamide (PFOSA) | 8 | ug/L | BDL |
| Perfluorooctane Sulfonate (PFOS) | 8 | ug/L | 490 |
| Perfluoropentanoic Acid (PFPeA) | 5 | ug/L | 51 |
| Perfluorotetradecanoic Acid | 14 | ug/L | 7 |
| Perfluorotridecanoic Acid | 13 | ug/L | 4.9 |
| Perfluoroundecanoic Acid (PFUnA) | 11 | ug/L | BDL |

Note:
BDL = Below Detection Limit

As can be seen from the above tables, the sites have similar types of PFAS, the primary difference is the concentrations, where site Z000 has much higher concentrations that are indicative of a source area nearby.

Figure 2:
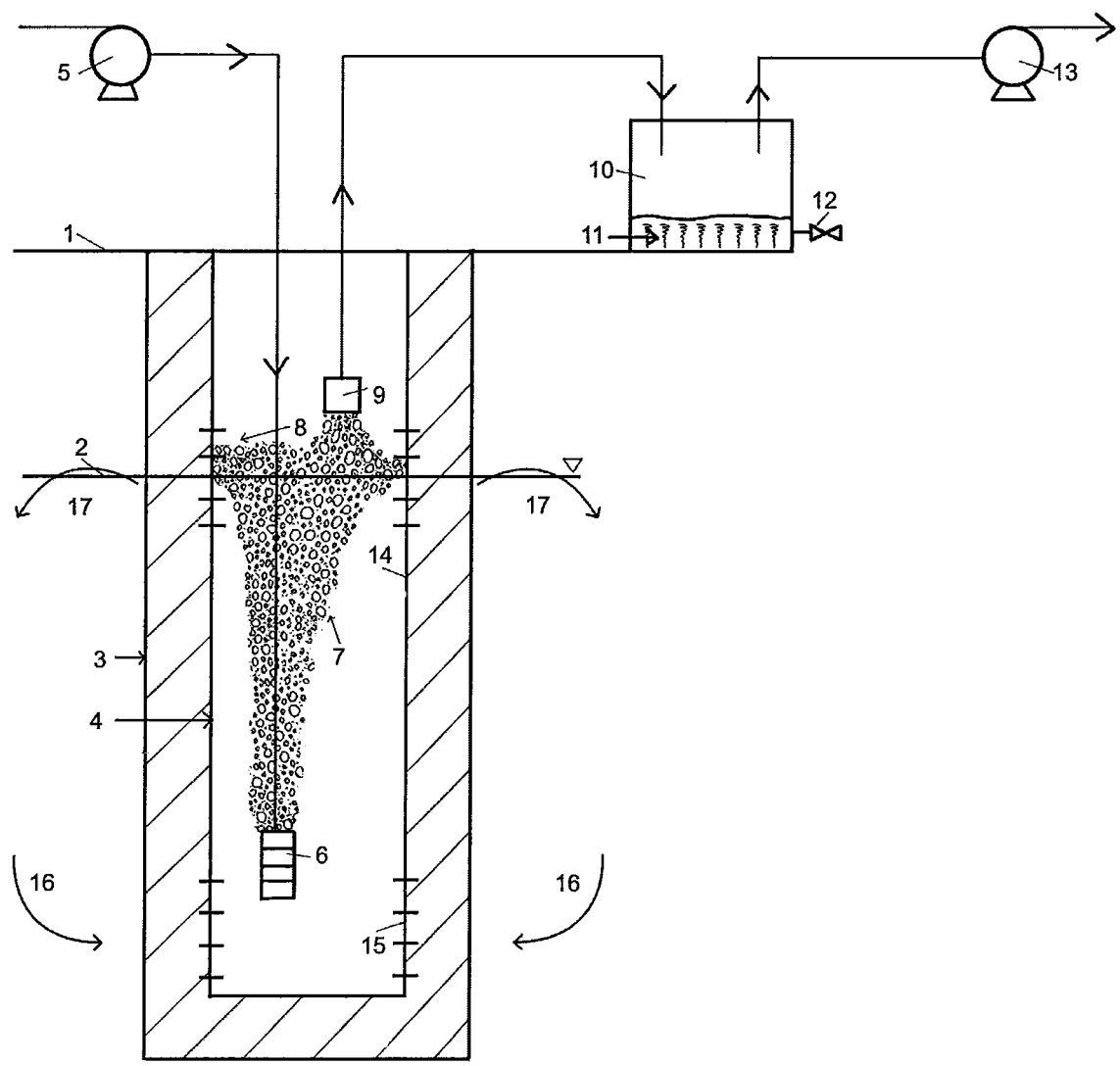
FIG. 2 is a process schematic of an exemplary system for in-situ treatment of PFAS contaminated soil and groundwater using foam generation and extraction.

Laboratory batch tests were conducted in one-liter graduated cylinders as a model for the groundwater treatment wells shown in FIG. 2. The test vessels were sparged with air or nitrogen (99% by volume) which produced a layer of foam on top of the water column that was subsequently removed by a collection tube placed under vacuum. The gases were sparged into the groundwater using either a Small or Large Diffuser. A ceramic fine bubble diffuser with nominal pore size of 25 microns was used as the Large Diffuser and a stainless steel porous metal sparger tube with a nominal pore size of 5 micron was used as the Small Diffuser. Both diffusers had similar surface areas. Diffusers with larger pore sizes were tested; however, it was determined that they were not able to produce acceptable foams. The remaining water in the test vessel was then sent for PFAS analysis using EPA Method 537 (modified).

TEST 1: The first experimental test was designed to demonstrate the effectiveness of air in removing PFAS from water. The Large Diffuser with a nominal pore size of 25 microns was used in this test. The experimental test conditions and results for this testing are shown in Table 3. PFHxS, PFOA, and PFOS were used as PFAS indicators for these tests.

TABLE 3

Effectiveness of Air Sparging, Large Diffuser, Z000 Groundwater

| | Flow Rate, L/min | Run Time, min | PFHxS, ug/l | PFOA, ug/l | PFOS, ug/l |
|---|---|---|---|---|---|
| Initial Concentration | 4 | 4 | 1,300 | 66 | 490 |
| Final Concentration | | | 71 | 2.0 | 20 |
| % Reduction | | | −95% | −97% | −96% |

As can be seen in Table 3, air was very effective in removing PFAS from water under these test conditions.

TEST 2: The second experimental test was set-up to investigate the difference between air and nitrogen sparging. It was hypothesized that under the same conditions, nitrogen should be more efficient than air since nitrogen is non-reactive and tends to form smaller bubbles than air when injected in water. The Large Diffuser with a nominal pore size of 25 microns was used in this test. The experimental test conditions and results for this testing are shown in Table 4. PFHxS, PFOA, and PFOS were used as PFAS indicators for these tests.

TABLE 4

Air vs. Nitrogen Performance Comparison, Large Diffuser, Z000 Groundwater

| | Flow Rate, L/min | Run Time, min | Concentrate, ml | PFHxS, ug/l, Final Concentration | PFOA, ug/l, Final Concentration | PFOS, ug/l, Final Concentration |
|---|---|---|---|---|---|---|
| Air | 4 | 4 | 140 | 83 | 2.3 | 31 |
| Nitrogen | 2 | 4 | 150 | 71 | 2.0 | 20 |
| % Difference | | | | −14% | −13% | −35% |

As can be seen in Table 4, nitrogen outperformed air with similar run times of 4 minutes and PFAS foam volumes ranging from 140 to 150 ml. However nitrogen was able to produce a similar volume of concentrate at one-half the flow rate of air and water PFAS concentrations that were less than the air sparged system. This test showed that nitrogen was more efficient than air in removing PFAS from water under these test conditions.

TEST 3: The third experimental test evaluated the difference of gas bubble size in PFAS removal from water. It was hypothesized that under the same conditions, small bubbles would be more efficient in removing PFAS from water than larger bubbles, since smaller bubbles have more total surface area and enhance the likelihood of contact of PFAS with a gas bubble in the water column.

The experimental conditions are summarized in Table 5. PFHxS, PFOA, and PFOS were used as PFAS indicators for these tests. A ceramic fine bubble diffuser with nominal pore size of 25 microns was used as the Large Diffuser and a stainless steel porous metal sparger tube with a nominal pore size of 5 micron was used as the Small Diffuser. As a point of reference, the Large Diffuser produced bubbles averaging about 1 mm in diameter whereas the Small Diffuser produced bubbles averaging about 0.2 mm in diameter.

TABLE 5

Large Diffuser vs. Small Diffuser, Nitrogen, Z000 Groundwater

|  | Flow Rate, L/min | Run Time, min | PFHxS, ug/l, Final Concentration | PFOA, ug/l, Final Concentration | PFOS, ug/l, Final Concentration |
| --- | --- | --- | --- | --- | --- |
| Large Diffuser | 2 | 4 | 71 | 2.0 | 20 |
| Small Diffuser | 2 | 4 | 9.4 | 0.46 | 3.8 |
| % Difference |  |  | −87% | −77% | −81% |

As can be seen in Table 5, the Small Diffuser outperformed the Large Diffuser in PFAS removal from water by a considerable margin. The conclusion from this test was that the Small Diffuser with <1 mm diameter bubbles was much more efficient that the Large Diffuser with >1 mm diameter bubbles in removing PFAS from water under these test conditions, even though both are considered fine bubble diffusers.

TEST 4: The fourth experimental test was set-up to evaluate using nitrogen and the Small Diffuser to remove low levels of PFAS using the low concentration (N000) groundwater. As with previous nitrogen tests, the flow rate was set at 2 liters per minute and the test was run for 4 minutes. To further evaluate the data, removal efficiencies for all measured PFAS are shown below in Table 4 below. They are arranged according to carbon chain length.

TABLE 6

Low Concentration (N000 Groundwater) PFAS Removal by Carbon Number, Small Diffuser, Nitrogen

|  | Carbon # | Units | Initial | Final | % Reduction |
| --- | --- | --- | --- | --- | --- |
| Perfluorobutane Sulfonate (PFBS) | 4 | ug/L | 0.27 | 0.27 | No Reduction |
| Perfluorobutanoic acid | 4 | ug/L | 0.14 | 0.13 | 7% |
| Perfluoro pentanoic Acid (PFPeA) | 5 | ug/L | 0.31 | 0.33 | No Reduction |
| 6:2 Fluorotelomer sulfonate | 6 | ug/L | 0.0069 J | 0.0032 U | 54% |
| Perfluorohexane Sulfonate (PFHxS) | 6 | ug/L | 5.7 | 2.7 | 53% |
| Perfluorohexanoic Acid (PFHxA) | 5 | ug/L | 0.93 | 0.89 | 4% |
| Perfluoroheptanoic Acid (PFHpA) | 7 | ug/L | 0.22 | 0.16 | 27% |
| Perfluoro-n-Octanoic Acid (PFOA) | 8 | ug/L | 1.7 | 0.65 | 62% |
| Perfluorooctane Sulfonate (PFOS) | 8 | ug/L | 1.6 | 0.26 | 84% |
| Perfluorononanoic Acid (PFNA) | 9 | ug/L | 0.055 | 0.0046 U | 92% |

Note:
U = Below Detection Limit so percent reductions may have been greater than the reported value.

As can be seen in Table 6, PFAS was removed from water under these experimental conditions, even though the starting concentrations were substantially less than the previous tests using Z000 groundwater. Another observation is that the PFAS removal efficiency appears to increase as the PFAS carbon chain length increases. It appears that, since the mechanism of separation occurs at the air/water interface, the long chain PFAS are removed more efficiently than the short chain PFAS. This led to the design of TEST 5 described below, to further investigate this observation.

TEST 5: A fifth test was set-up to determine if experimental conditions can be optimized for both short and long chain PFAS removal. Z000 groundwater was used for this evaluation. As with previous nitrogen tests, the flow rate was set at 2 liters per minute and the test was run for 4 minutes.

As a basis of comparison, the results from TEST 1 are presented in an expanded PFAS format showing all measured PFAS and arranged according to carbon chain length as shown in Table 7.

TABLE 7

High Concentration (Z000 Groundwater) PFAS Removal by Carbon Number, Large Diffuser, Air

| Analyte | Carbon # | Units | Initial | Final | % Reduction |
| --- | --- | --- | --- | --- | --- |
| Perfluorobutane Sulfonate (PFBS) | 4 | ug/L | 200 | 160 | 20% |
| Perfluorobutanoic acid | 4 | ug/L | 44 | 39 | 11% |
| Perfluoropentanoic Acid (PFPeA) | 5 | ug/L | 51 | 44 | 14% |
| 6:2 Fluorotelomer sulfonate | 6 | ug/L | 2.8 | 0.20 U | 93% |
| Perfluorohexane Sulfonate (PFHxS) | 6 | ug/L | 1300 | 71 | 95% |
| Perfluorohexanoic Acid (PFHxA) | 6 | ug/L | 270 | 170 | 37% |
| Perfluoroheptanoic Acid (PFHpA) | 7 | ug/L | 36 | 5.8 | 84% |
| Perfluoro-n-Octanoic Acid (PFOA) | 8 | ug/L | 66 | 2.0 | 97% |
| Perfluorooctane Sulfonate (PFOS) | 8 | ug/L | 490 | 20 | 96% |
| Perfluorotridecanoic Acid | 13 | ug/L | 4.9 | 0.28 U | 94% |
| Perfluorotetradecanoic Acid | 14 | ug/L | 7 | 0.22 U | 97% |

Note:
U = Below Detection Limit so percent reductions may have been greater than the reported value.

This experimental test was set-up to evaluate using nitrogen and the Small Diffuser to remove PFAS using the high concentration (Z000) groundwater. As with previous nitrogen tests, the flow rate was set at 2 liters per minute and the test was run for 4 minutes.

TABLE 8

High Concentration (Z000 Groundwater) PFAS Removal by Carbon Number, Small Diffuser, Nitrogen

| Analyte | Carbon # | Units | Initial | Final | % Reduction |
| --- | --- | --- | --- | --- | --- |
| Perfluorobutane Sulfonate (PFBS) | 4 | ug/L | 200 | 53 | 74% |
| Perfluorobutanoic acid | 4 | ug/L | 44 | 15 | 66% |
| Perfluoropentanoic Acid (PFPeA) | 5 | ug/L | 51 | 18 | 65% |
| 6:2 Fluorotelomer sulfonate | 6 | ug/L | 2.8 | 0.032 U | 99% |
| Perfluorohexane Sulfonate (PFHxS) | 6 | ug/L | 1300 | 9.4 | 99% |
| Perfluorohexanoic Acid (PFHxA) | 6 | ug/L | 270 | 43 | 88% |
| Perfluoroheptanoic Acid (PFHpA) | 7 | ug/L | 36 | 0.79 | 98% |

TABLE 8-continued

High Concentration (Z000 Groundwater) PFAS Removal
by Carbon Number, Small Diffuser, Nitrogen

| Analyte | Carbon # | Units | Initial | Final | % Reduction |
|---|---|---|---|---|---|
| Perfluoro-n-Octanoic Acid (PFOA) | 8 | ug/L | 66 | 0.46 | 99% |
| Perfluorooctane Sulfonate (PFOS) | 8 | ug/L | 490 | 3.8 | 99% |
| Perfluorotridecanoic Acid | 13 | ug/L | 4.9 | 0.033 U | 99% |
| Perfluorotetradecanoic Acid | 14 | ug/L | 7 | 0.038 U | 99% |

Note:
U = Below Detection Limit so percent reductions may have been greater than the reported value.

As illustrated by the data in Table 8, these test conditions greatly increased the PFAS removal efficiency for all PFAS as compared to the PFAS removal efficiencies shown in Table 7. There is some apparent preference for long chain PFAS removal over short chain PFAS removal, however this data shows that it is possible to remove long and short carbon chain PFAS by optimizing the performance of the Invention.

Optimization techniques may include adjusting injected gas bubble size and gas composition as shown in the preceding tests. In addition, contact time can be increased. This is particularly relevant for field application since most treatment wells will have longer bubble columns than the test vessels used in these experiments. For example, the laboratory test vessels had a column (bubble) height of one foot whereas a treatment well installed in the field will have a column (bubble) height of at least ten feet. In addition, based in typical groundwater flow rates, the contact time for treatment wells installed in the field will typically range from hours to days as opposed to the minute timeframes used in the laboratory experiments. Therefore even though the laboratory tests results showed good PFAS removal performance, even higher PFAS removal performance is expected in the field.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed:

1. A method for decontamination of water containing one or more per- and polyfluoroalkyl substances (PFAS) contaminants, comprising:
injecting a gas through a diffuser and into water so as to form a plurality of bubbles in the water, the one or more PFAS contaminants accumulating on the plurality of bubbles;
allowing the plurality of bubbles to rise, forming a foam at the surface of the water; and collecting the foam from the surface of the water,
wherein the diffuser is comprised of a plurality of pores having a nominal pore size of 25 microns or less, and
wherein the gas is 95% or more nitrogen by volume.

2. The method of claim 1, wherein the diffuser is positioned within a groundwater well and below the surface of the groundwater when the gas is injected through the diffuser and into the water.

3. The method of claim 2, wherein the groundwater well is provided with at least one influent screen portion and at least one effluent screen portion.

4. The method of claim 1, further comprising, prior to injecting the gas through the diffuser, creating a groundwater well and positioning the diffuser within the groundwater well and below the surface of the groundwater.

5. The method of claim 1, wherein the gas is injected through a diffuser and into the water so as to form a plurality of bubbles in the water that are less than 2 mm in diameter.

6. The method of claim 1, further comprising transporting the foam to a knock-out vessel where condensed liquid containing the one or more PFAS contaminants is collected.

7. The method of claim 6, further comprising removing the condensed liquid containing the one or more PFAS contaminants from the knock-out vessel and treating the one or more PFAS contaminants.

8. The method of claim 6, wherein the knock-out vessel is in communication with a vacuum source.

9. The method of claim 1, wherein the gas is comprised of air.

10. The method of claim 1, wherein the gas is 99% or more nitrogen by volume.

11. The method of claim 1, wherein the foam is collected from the surface of the water by a foam capturing device that is in communication with a vacuum source.

12. The method of claim 2, further comprising transporting the foam to a knock-out vessel by a positive displacement pump positioned in the groundwater well.

13. The method of claim 1, wherein an oxidizing gas is added to the gas before it is injected into the diffuser, the oxidizing gas being utilized to oxidize PFAS precursors.

14. The method of claim 13, wherein the oxidizing gas is ozone.

15. The method of claim 1, wherein the foam is collected from the surface of the water with a foam capturing device that provides additional surface area for foam capture with a larger diameter than a pipe connected to the foam capturing device.

16. The method of claim 15, wherein the foam capturing device is comprised of a floating material so as to accommodate fluctuating groundwater tables.

17. The method of claim 1, wherein the one or more PFAS contaminants are one or more long-chain PFAS constituents.

18. The method of claim 1, wherein the one or more PFAS contaminants are one or more short-chain PFAS constituents.

19. The method of claim 1, wherein the one or more PFAS contaminants are comprised of perfluorooctanoate (PFOA) or perfluorooctane sulfonate (PFOS) or both.

* * * * *